(12) United States Patent
Murphy

(10) Patent No.: US 7,076,879 B2
(45) Date of Patent: Jul. 18, 2006

(54) STABILIZER JIG FOR DISTANCE MEASURING LASER

(75) Inventor: Dennis Murphy, Indianapolis, IN (US)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 10/921,814

(22) Filed: Aug. 20, 2004

(65) Prior Publication Data

US 2005/0102848 A1    May 19, 2005

Related U.S. Application Data

(60) Provisional application No. 60/520,314, filed on Nov. 17, 2003.

(51) Int. Cl.
*G01C 15/12* (2006.01)
*G01B 5/24* (2006.01)

(52) U.S. Cl. .......................... 33/284; 33/227; 33/1 N; 33/DIG. 21

(58) Field of Classification Search ................. 33/227, 33/263, 282, 284, 534, 568, 573, DIG. 21, 33/1 N, 430, 465, 471; 269/55; 356/3
See application file for complete search history.

(56) References Cited

U.S. PATENT DOCUMENTS

| | | | | |
|---|---|---|---|---|
| 2,279,321 A | * | 4/1942 | Janssen ........................ 33/284 |
| 3,331,134 A | * | 7/1967 | Jackson et al. ................ 33/534 |
| 4,333,242 A | * | 6/1982 | Genho, Sr. .................... 33/227 |
| 4,703,563 A | * | 11/1987 | Hoshino et al. ............... 33/227 |
| 4,967,482 A | * | 11/1990 | Hoover et al. ................ 33/760 |
| 5,172,484 A | * | 12/1992 | Triola ........................... 33/534 |
| 5,584,458 A | * | 12/1996 | Rando .................... 248/231.41 |
| 5,611,149 A | * | 3/1997 | Fujiwara ....................... 33/534 |
| 5,685,085 A | * | 11/1997 | Bond ........................... 33/520 |
| 5,809,662 A | * | 9/1998 | Skinner ........................ 33/768 |
| 6,012,229 A | * | 1/2000 | Shiao ........................... 33/227 |
| 6,098,303 A | * | 8/2000 | Vogel ........................... 33/768 |
| 6,195,902 B1 | * | 3/2001 | Jan et al. ................ 33/DIG. 21 |
| 6,453,568 B1 | * | 9/2002 | Hymer ................... 33/DIG. 21 |
| 6,754,969 B1 | * | 6/2004 | Waibel ................... 33/DIG. 21 |
| 6,823,600 B1 | * | 11/2004 | Vaughan ................ 33/DIG. 21 |
| 6,839,974 B1 | * | 1/2005 | Hitchcock .............. 33/DIG. 21 |

* cited by examiner

*Primary Examiner*—G. Bradley Bennett
(74) *Attorney, Agent, or Firm*—Birch, Stewart, Kolasch and Birch, LLP

(57) ABSTRACT

A stabilizer jig for holding a distance measuring laser for determining distances measured along an angle. When an escalator is being installed in a construction site, the jig may be used to make difficult distance measurements between floors to ascertain that the construction distances are correct for the manufactured escalator system. A rotating pocket holds the laser and measures the angle while holding the laser steady as it makes the distance determination.

12 Claims, 2 Drawing Sheets

STABILIZER JIG FOR DISTANCE MEASURING LASER

CROSS-REFERENCE TO RELATED APPLICATIONS

The present nonprovisional application claims priority under 35 USC § 119 to U.S. Patent Application No. 60/520,314 filed on Nov. 17, 2003, the entire contents thereof being hereby incorporated by reference.

BACKGROUND OF THE INVENTION

1. Field of the Invention

The present invention relates to a stabilizer jig for a distance measuring laser and more particularly to a stabilizer jig for holding a distance measuring laser steady when measuring distances at an angle.

2. Discussion of the Background

Accurate measurements are critical in any type of building or manufacturing in order that various components fit correctly and match the original design. In particular, in construction environments it is critical that accurate measurements are taken so that the constructed building meets code requirements and follows the design of the architect and engineers. Of particular importance are measurements where prefabricated or pre-engineered products are being installed, since the pre-engineered product will not fit properly if the dimensions at the construction location are inaccurate. This may not only prevent the installation of the pre-engineered device, but may require part of the building to be rebuilt, thus causing expensive delays.

Any number of traditional tools have been developed for measuring distances on construction sites. Thus, standard rulers in the form of tape measures are well known. Other surveying devices, such as theodolites, are also used to measure differences in height along long horizontal distances. Other measuring instruments, such as protractors, can be used for measuring angles. Generally, the accuracy of these instruments is determined by the care in which they are utilized. However, there may be other determining factors in their accuracy, such as the ability to stretch a tape measure taut over a long distance.

A number of newer instruments have also been developed which are very accurate when used properly. For example, a distance measuring laser is now available which emits a laser beam and calculates the distance to a target spot where the beam is reflected back to the unit. Such a device usually determines the time that the light takes to travel to the target and back and calculates the distance thereby. While this type of device is very accurate, it must be held in a steady position and not be allowed to move during the course of the measurement. This can be especially difficult when the distance measured is not a simple horizontal or vertical distance, but must be measured along an angle so that no solid surface is present on which the device may be placed.

One type of installation in which it is especially critical to obtain accurate measurements is in the installation of escalator systems in buildings. Typically, the escalator is built in the factory according to certain specifications and dimensions. The installation site must match these measurements in order for the escalator to fit properly. These dimensions can be very difficult to measure since the escalator often extends from a pit on a lower floor to a landing area on an upper floor where the pit and the landing area are some distance from each other horizontally. In particular, it is very difficult to measure the distance along the angle from the edge of the pit to the landing area because it is measured at an angle over a fairly long distance. Furthermore, these measurements must be conducted before the building is in the final construction phase, so that many of the floors are not yet built up to their final height.

Current procedures require that the construction site be reviewed before the escalator is manufactured so that there are no errors between the manufactured escalator and the corresponding dimensions at the construction site. Many of these measurements can be relatively easily determined using either a simple tape measure or a distance measuring laser, especially where the dimensions are relatively short and are along a simple horizontal or vertical dimension. These determinations may be aided by a multi-direction laser, which can simultaneously establish a beam in three mutually perpendicular directions. This helps to establish baselines and determine the straightness of walls in more than one direction. However, one particular measurement which is difficult to obtain using hand-held tools is the accurate measurement of distances along an incline, such as from one floor to the next, which is very common in escalator installations.

SUMMARY OF THE INVENTION

The present invention provides a stabilizer jig for holding a distance measuring laser.

The present invention further provides an instrument for measuring distances along an incline.

The present invention further provides a stabilizer jig for measuring distances in an escalator installation environment.

The present invention further provides a device for measuring the angle of incline between two points.

The present invention further provides a stabilizer jig for holding a distance measuring laser steady when measuring distances at an angle.

The present invention still further provides a measuring instrument for determining distances measured at an angle to a floor.

The present invention further provides for a laser survey of a construction site.

Briefly, the invention achieves this by providing a stabilizer jig having a rotatable pocket, for holding a distance measuring laser connected to a solid base for mounting on a horizontal surface, where the angle of the laser is measured as it rotates.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF PREFERRED EMBODIMENTS

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
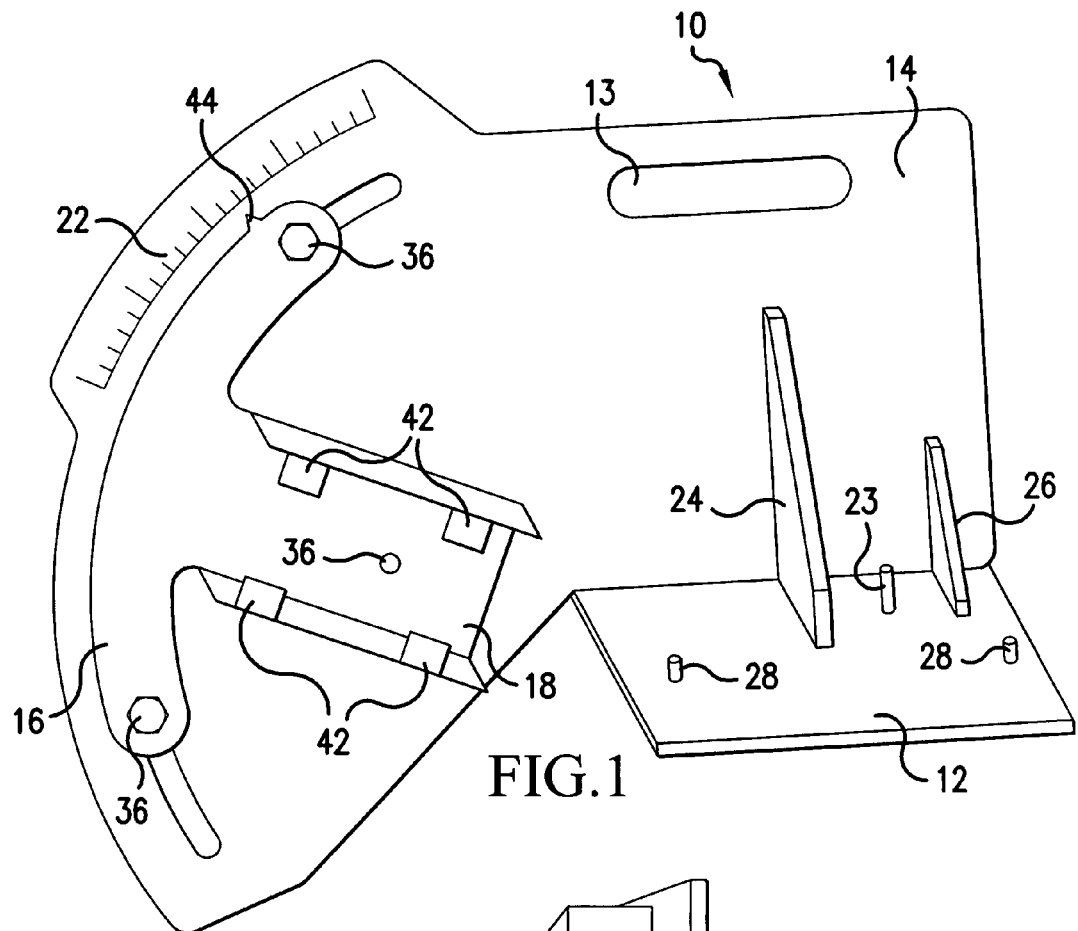
FIG. 1 is a perspective view of the present invention.
Figure 2:
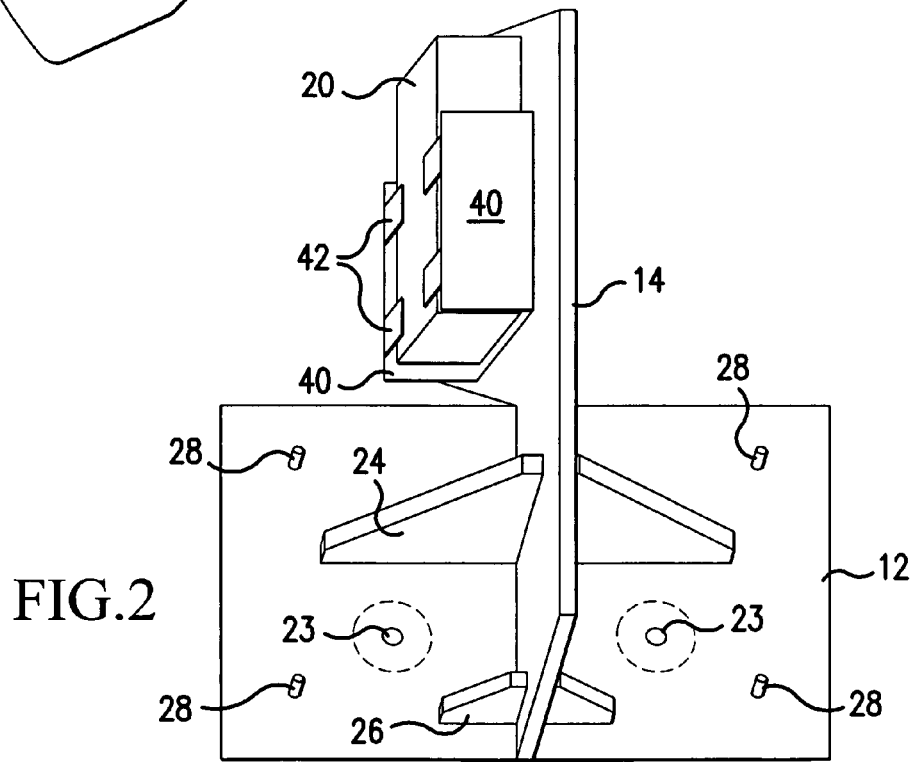
FIG. 2 is a top view of the present invention.

In order to properly survey the construction site for installation of an escalator, a stabilizer jig 10 is provided, as shown in FIGS. 1 and 2. The jig includes a flat base 12 for placing on a horizontal surface during measurement. A vertical plate 14 is mounted perpendicularly to the base and slides into and out of position to allow for compact storage. A notched handle 13 allows the vertical plate to be gripped easily during assembly. The plate is further supported by brackets 24 and 26, which are perpendicular to both the plate and the base. The sides of these braces may be angled in a triangular fashion, but may have other shapes also. The braces may be attached to both the plate and the base by welding, preferably. The braces may also be slotted to interact with slots 25 in the plate to further lock the elements into position.

Figure 3:
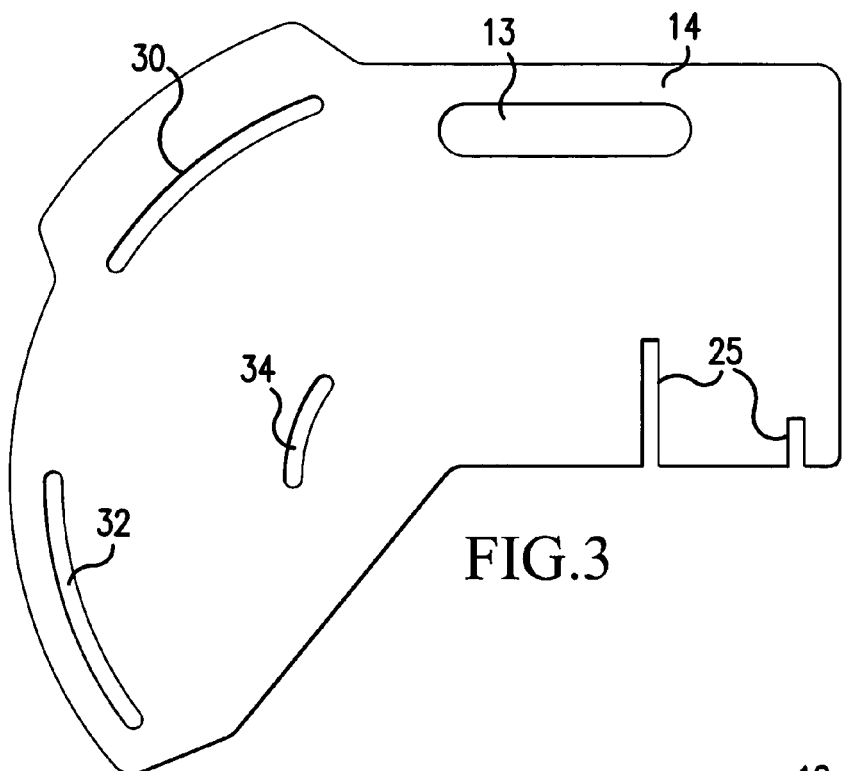
FIG. 3 is a front view of the vertical plate of the present invention.

The left-hand end of vertical plate 14 extends beyond the edge of base 12 and also extends downwardly to form an arc of the circle. As shown in FIG. 3, this arc-shaped section contains therein circular grooves 30, 32 and 34. These three grooves are designed to match with bolts 36 which extend through the rotating element 16 which includes a pocket part 18. The pocket is designed to receive a commercially available distance measuring laser device 20. This device is typically a rectangular solid, but can be in any shape. The pocket is designed to easily receive this device and to hold it firmly in position.

Figure 5:
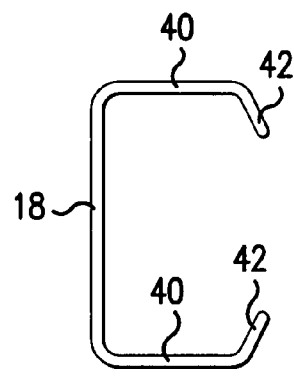
FIG. 5 shows an end view of the pocket of the present invention.
Figure 4:
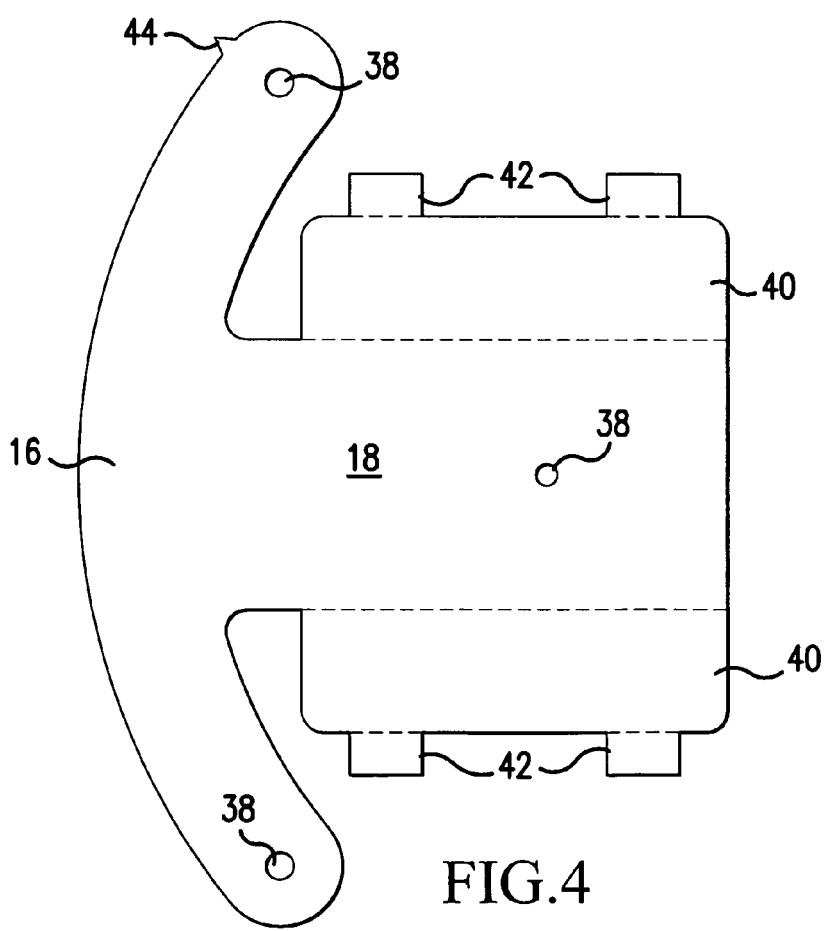
FIG. 4 is a front view of a blank for making a rotating pocket for use in the present invention.

FIG. 4 shows a blank from which this rotating pocket element can be formed. As seen in FIG. 4, an area is formed in the shape of a rectangular arc and contains holes 38 in two positions on the arc. These correspond to circular grooves 30 and 32 in the vertical plate. The pocket part 18 is formed from a flat sheet which is bent along two lines to form sides 40. Tabs 42 on the outer end of the sides 40 are also bent to extend toward each other. The result is a pocket part 18, as shown in FIG. 5, with sides 40 and tabs 42 for receiving the laser device 20. Pocket 18 also includes a hole 38 which corresponds to circular groove 34. The edge of the arc portion includes a pointer 44 to indicate the angle of rotation of the device when the measurement is taken. As seen in FIG. 1, a scale 22 is attached to or etched on the vertical plate. The pointer 44 indicates the vertical angle of the laser in relationship to the horizontal surface defined by plate 12.

In operation, the plate 12 is placed on the floor or other horizontal surface and is leveled using a spirit level (not shown) and adjusting screws 28. When the base 12 is horizontal, the plate 14 will be vertical and the pocket will rotate in a vertical plane. The laser can be placed within the pocket and screws 36 loosened to allow the pocket to be adjusted angularly so that the laser beam is aimed at the target. Screws 36 can then be tightened to hold the jig firmly in position while the measurement is being taken. Screw 36 within the pocket can also be used to hold the laser firmly in position within the pocket, if desired. Other devices can also be used to firmly fasten the laser within the pocket.

Since the jig is typically used on the edge of a pit, the edge of the base closest to the pocket is aligned with the edge of the pit before the base is leveled. When the laser is placed within the pocket, the end of the device away from the laser emission end is placed firmly against the edge of the pit and/or the edge of the base 12. This line is the center of the arc on the outer edge of the rotating element 16. Accordingly, when the laser is in this position, an accurate measurement is taken from the edge of the pit/edge of the base to the point of the target. Also, the angle of the laser beam is accurately measured by the scale 22 and pointer 44.

In order to hold the base firmly in position while the measurement is being taken, two heavy weights are placed on the base. These are placed on set pins 23 located between brackets 24 and 26, on both sides of the vertical plate to ensure stability of the jig. It might also be possible to attach the base to the floor using other means, such as clamps, depending on the arrangement of the floor. However, some stabilizing facility is desirable.

The bolts 36 are typically held on the back side of the plate by a nut, preferably a wing nut. Nylon washers are utilized, to minimize friction. It is also possible to utilize an arc-shaped piece corresponding to the shape of element 16 on the back of the plate to provide further stability.

The scale 22 indicating the angle of the laser to the horizontal is preferably a precisely machined degree indicator which is then riveted to the plate at the appropriate position. It can also be etched permanently on the plate instead.

The plate may contain various sized and shaped holes in order to reduce the weight of the device. Preferably, the jig is made from aluminum in sheet form. However, it would also be possible to make the jig from any number of other materials, including steel or other metals, plastics or other composite materials. The jig may be made of any size that is convenient for holding the laser, and preferably has a base on the order of 12 inches wide and 7 inches deep. The plate may have a horizontal dimension of 16 inches and a vertical dimension on the order of 15 inches. The pocket should have a size corresponding to the laser which is inserted therein, and may be roughly 3 inches wide and 1½ inches thick.

The stabilizer jig and distance measuring laser are used along with an multi-direction laser to survey the construction site to ascertain that the measurements match those required for the escalator. This is preferably done before the escalator construction begins in the factory. The following description of this survey assumes that a pit is formed on the lower level to receive the lower end of the escalator and that a support recess is at one end of this pit below the level of the floor but substantially above the level of the pit. A support recess is also formed in the upper floor at the edge of the landing area at the upper end of the escalator. The following steps are provided to ensure accurate measurements during such a survey.

On the lower floor, a multi-directional laser is placed on the floor near the edge of the support recess. A final floor level mark is established if the final floor has not yet been placed. The distance to the horizontal beam is measured from this mark and the distance from the beam to the bottom of the support recess is measured to determined the accurate position of the support recess in relationship to the final floor level. The length of the support recess is measured in the standard fashion using a tape measure. The width of the pit is measured by placing the distance measuring laser against the side wall of the pit and measuring at a number of locations to determine that the pit width is accurate. Likewise, the length of the pit is measured by placing the distance measuring laser at one end of the pit and measuring the distance to the other end. The depth of the pit is measured by placing one end of the distance measuring laser at the level of the support recess to measure the distance to the bottom of the pit. This distance can be added to the distance from the support recess to the finished floor level to give the complete depth measurement.

The symmetry of the lower pit is determined by placing the multi-direction laser in one corner and measuring the distance from the beam to the walls in three directions to see if all are perfectly perpendicular.

The elevation of the support recess on the upper floor from the lower floor level is determined by placing the multi-direction laser on the lower floor next to the pit. Any variation in the lower floor from the laser is noted. The distance measuring laser is placed at the edge of the upper support recess to determine the distance from that point to the lower floor directly below it. If the lower floor shows a deviation from the multi-direction laser, this should also be taken into consideration since it indicates that the elevation of the lower floor is not uniform. The depth of the upper support recess from the upper floor level can also be measured by a tape measure so that the total distance from the upper floor to the lower floor can be measured. If the upper floor does not have a finished floor yet, a similar procedure to that described above in regard to the lower floor should also be utilized to determine the distance from the support recess to the finished floor level. The other dimensions of the upper support recess can be measured using a tape measure and distance measuring laser in the same fashion as the lower floor.

The most difficult part of the survey is to determine the distance from the pit to the upper support recess using the stabilizer jig. The jig is placed at the edge of the pit on the lower level near one of the side walls. The distance measuring laser is placed in the pocket of the jig. The jig is leveled and the distance to the recess support on the upper level is measured while the stabilizer jig is locked in position. This measurement may be taken at both sides of the pit to ascertain that no variance occurs laterally.

Other measurements, such as intermediate support dimensions and locations of power supply and sprinkler entrances, can also be measured using traditional techniques. By providing this survey, the accuracy of the construction location is determined so that the pre-engineered escalator system can be installed without difficulty.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A stabilizer jig comprising:
   a horizontal base having a stabilizer plate for holding said jig;
   a vertical plate including an angular scale, said vertical plate extending both above and below a surface of the stabilizer plate;
   a rotating holder rotatably mounted on said vertical plate, said rotating holder including a pocket for receiving a distance measuring laser device, wherein the rotating holder is placed at a desired angle of inclination as indicated by said angular scale in order to make a distance measurement with the measuring device.

2. The jig according to claim 1, wherein the rotating holder has an arc shaped portion.

3. The jig according to claim 1, further comprising brackets for stabilizing said vertical plate in relation to said horizontal base.

4. The jig according to claim 1, further comprising adjustment screws for leveling the jig.

5. The jig according to claim 1, wherein the scale is mounted on the vertical plate.

6. The jig according to claim 1, wherein the scale is etched on the vertical plate.

7. The jig according to claim 1, wherein the rotating holder includes a pointer for indicating the angle on the scale.

8. The jig according to claim 1, wherein the vertical plate includes arc-shaped grooves and said rotating holder includes holes for receiving bolts passing through said grooves.

9. The jig according to claim 1, wherein said pocket includes side walls and tabs extending from the edges of the side walls toward each other for holding said measuring device.

10. The jig according to claim 1, wherein the base is leveled, the rotating holder is rotated to point to a target, and the measuring device determines the distance from the jig to the target.

11. The jig according to claim 1, wherein the rotating holder is made from a blank which is folded to form the pocket.

12. A measuring device for simultaneously measuring a distance and an angle of inclination, comprising:
   a base plate for stabilizing said measuring device;
   an indicating plate mounted on said base plate and extending both above and below said base plate;
   said indicating plate including an angular scale;
   a rotating holder mounted on said indicating plate, said rotating holder including a pocket for receiving a distance measuring laser device;
   said rotating holder being moved to a desired position in order to measure a distance, said distance measuring laser device indicating said distance and said angular scale indicating an angle of inclination of said rotating holder at the same time.

* * * * *